United States Patent [19]

Okamoto et al.

[11] 4,368,895
[45] Jan. 18, 1983

[54] SHAFT SEALING DEVICE UTILIZING A NON-UNIFORM GROOVE DEPTH

[75] Inventors: Kouichi Okamoto, Kobe; Masaki Sakuyama, Ashiya, both of Japan

[73] Assignee: Mitsubishi Denki Kabushiki Kaisha, Tokyo, Japan

[21] Appl. No.: 212,044

[22] Filed: Dec. 1, 1980

[51] Int. Cl.$^3$ ............................ F16J 15/40; F16J 15/44
[52] U.S. Cl. ....................................... 277/203; 277/15; 277/53; 277/59; 277/3
[58] Field of Search ................... 277/3, 59, 167, 203, 277/53, 15

[56] References Cited

U.S. PATENT DOCUMENTS

| | | | |
|---|---|---|---|
| 3,131,942 | 5/1964 | Ertaud | 277/53 |
| 3,360,272 | 12/1967 | Blom et al. | 277/3 |
| 3,558,238 | 1/1971 | Van Herpt | 277/53 X |
| 3,746,350 | 7/1973 | Mayer et al. | 277/15 X |
| 3,906,730 | 9/1975 | Bellati et al. | 277/15 X |
| 3,909,012 | 9/1975 | Denis | 277/15 |
| 3,942,803 | 3/1976 | Wijnout et al. | 277/53 |

FOREIGN PATENT DOCUMENTS

| | | | |
|---|---|---|---|
| 2363661 | 7/1974 | Fed. Rep. of Germany | 277/203 |
| 1042989 | 6/1953 | France | 277/59 |
| 397362 | 2/1966 | Switzerland | 277/53 |

OTHER PUBLICATIONS

Windback Seals–"A Simple Theory and Design Method and the Main Practical Limitations" by A. B. Crease in the Proceedings of the 7th International Conference on Fluid Sealing of Sep. 24–26, 1975, Paper H1, pp. H1-1 thru H1-20, BHRA Fluid Engineering, Cranfield, Bedford, England.

*Primary Examiner*—Robert S. Ward, Jr.
*Attorney, Agent, or Firm*—Sughrue, Mion, Zinn, Macpeak & Seas

[57] ABSTRACT

A shaft sealing device stable in sealing effect and which causes no seal breakdown is provided by changing the groove depth of a thread cut in a rotary shaft in the axial direction in such a manner that the groove depth of the thread on the high liquid pressure side is larger than that on the low liquid pressure side. In one embodiment, the groove depth on the high pressure side is larger than on the low pressure side of the thread with the groove depth varying continuously from the high pressure side to the low pressure side. In another embodiment, the groove depth is constant in a portion of the shaft on the low pressure side and decreases towards the low pressure in a portion of the shaft on the high pressure side.

8 Claims, 6 Drawing Figures

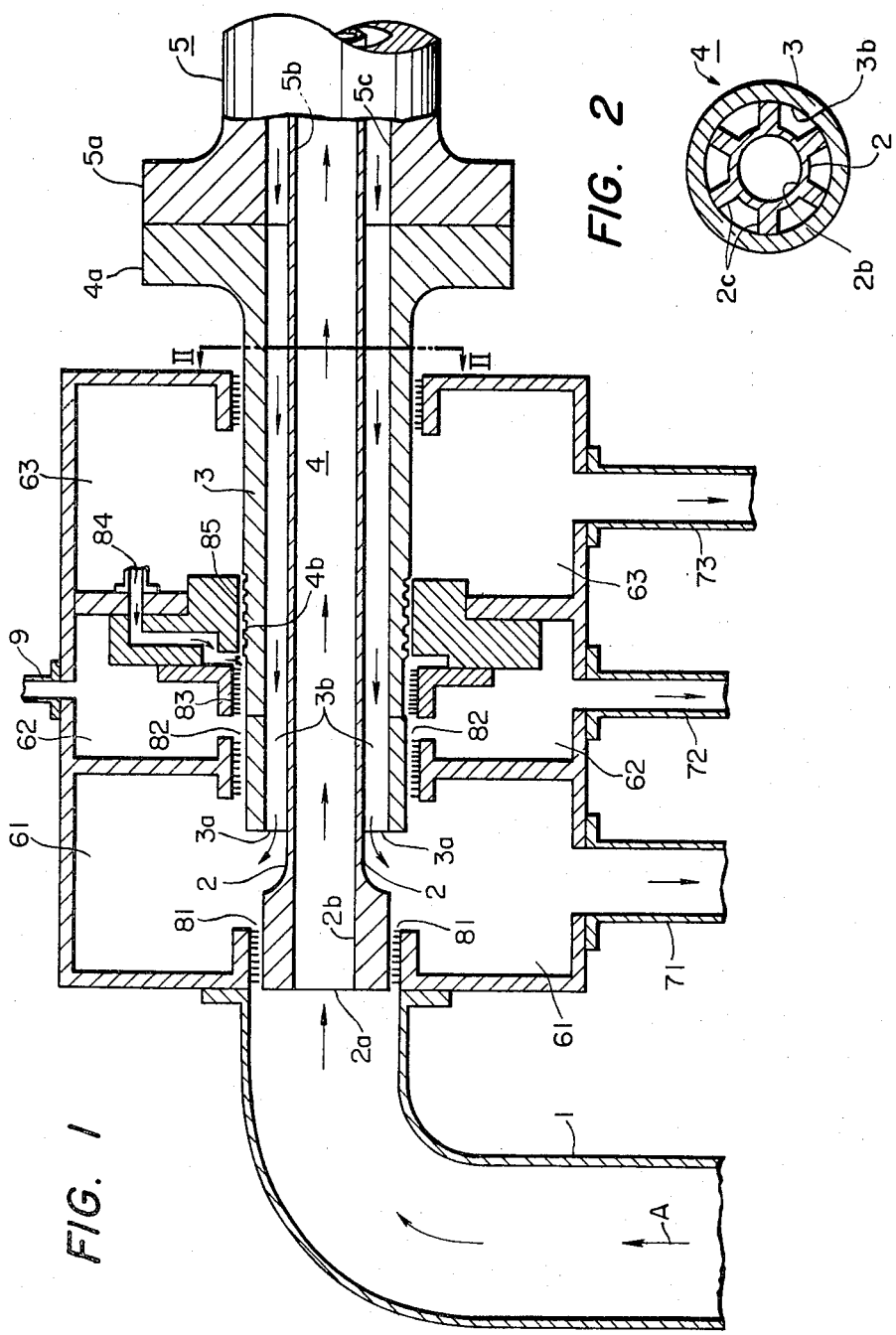

SHAFT SEALING DEVICE UTILIZING A NON-UNIFORM GROOVE DEPTH

BACKGROUND OF THE INVENTION

1. Field of the Invention

The present invention relates to a shaft sealing device for preventing the leakage of liquid from a rotary shaft.

2. Description of the Prior Art

A conventional method of preventing the leakage of liquid from around a rotary shaft will be described with reference to a liquid cooled rotor type rotary electric machine by way of example.

As is well known in the art, any increase of the capacity of a rotary electric machine depends on the ability to suppress increases in the temperature thereof, that is, how to effectively cool the machine. In other words, the maximum permissible capacity of a rotary electric machine is determined by its maximum temperature and hence its ability to dissipate heat. On the other hand, there has been a strong demand for increased capacity of rotary electric machines including electric generators and especially turbine generators in order to improve the efficiency of power plants. For this purpose, a cooling technique of circulating hydrogen gas for cooling a turbine generator has been employed thus increasing the capacity thereof. However, this technique appears to have met its limit for increased capacity. Accordingly, it is necessary to provide another suitable cooling technique.

In order to meet this requirement, a technique has been proposed in which, instead of hydrogen gas, a cooling fluid such as water which is high in cooling efficiency is employed as the cooling medium. According to this technique, a cooling liquid is circulated in the stator to cool the latter. If this technique could be developed satisfactorily to cause the cooling liquid to circulate not only in the stator but also in the rotor, then the cooling effect would be greatly improved.

For instance, in the case of a turbine generator, its rotor rotates at a high speed of 3600 rpm. (60 Hz). Therefore, the forcing of the cooling liquid through the desired paths in high-speed rotating element is a problem the solution of which is considerably difficult. This difficult problem has retarded the commercialization of liquid cooled rotor type rotary electric machines.

FIG. 1 shows a device for directing the flow of cooling liquid in a liquid cooled rotor to which the technical concept of the invention is applicable. In FIG. 1, reference numeral 1 designates an inlet pipe through which a cooling liquid such as pure water is supplied with the aid of a supply pump (not shown), 2 a cylindrical liquid inflow pipe for receiving the cooling liquid from the inlet pipe 1 through an opening 2a with the hollow interior 2b forming the inflow path of the cooling liquid, and 3 a liquid outflow pipe placed over the inflow pipe 2 with a gap 3b providing a predetermined clearance therebetween. Pure water is preferred so as to not corrode any of the pipes with impurities. The gap 3b is utilized as the outflow path of the cooling liquid. The outflow pipe 3 has an opening 3a through which the cooling liquid is discharged. The outflow pipe 3 and the inflow pipe 2 are connected together to form a cooling liquid supplying and draining pipe 4 as shown in FIG. 2. As is apparent from FIG. 2, the inflow pipe 2 has a plurality of (six in the case of FIG. 2) protruding pieces 2c extending from the outer wall of the pipe 2. The protruding pieces 2c serve as spacers which couple the inflow pipe 2 and the outflow pipe 3 together and reinforce the pipes 2 and 3. The inflow pipe 2 with the protruding pieces 2c is made integral with the outflow pipe 3, for instance, by shrink fitting, to form the supplying and draining pipe 4. The pipe 4 has a flange 4a at its end which is coupled to the flange 5a of the shaft of the rotor of a rotary electric machine with bolts or the like (not shown). The rotor coil (not shown) is mounted on the shaft 5. As is clear from FIG. 1, an inflow path 5b and an outflow path 5c are formed in the rotor shaft 5 and are communicated with the inflow path 2b and the outflow path 3b in the supplying and draining pipe 4, respectively, so that the cooling liquid supplied through the inflow path 5b, after circulating in the rotor coil, is discharged into the outflow path 5c. In FIG. 1, the arrows indicate the flow of the cooling liquid. As described above, the cooling liquid, after cooling the rotor coil by circulating therein, is drained from the opening 3a of the outflow pipe 3 through the outflow paths 5c and 3b.

The device has a first outlet chamber 61 for receiving the liquid discharged from the opening 3a. The chamber 61 is so designed that it is always filled with the cooling liquid in order to prevent contamination of the cooling liquid (pure water) which might occur if the liquid were to be brought into contact with the atmosphere. The first outlet chamber 61 has a first outlet pipe 71 for conducting the cooling liquid out of the chamber 61. The cooling liquid discharged from the first outlet pipe 71 is not brought into contact with atmospheric air, that is, it is prevented from being contaminated, and therefore it can be resupplied to the inlet pipe 1 through a supply pump (not shown) after its temperature is decreased by a heat exchanger or the like (not shown). That is, the water can be recirculated.

In FIG. 1, reference numeral 81 designates a first labyrinth seal for preventing the leakage of cooling water from the inlet pipe 1 into the first outlet chamber 61. It is impossible to completely eliminate the leakage of liquid between a stationary part and a rotary part, but it is necessary to make maximum efforts to prevent the leakage of liquid. The liquid leaked into the chamber 61 will cause no serious difficulty because it is recirculated through the outlet pipe 71. However, it goes without saying that the amount of leaked liquid should be as small as possible because, if it is excessively large, the efficiency of the device is decreased.

A second labyrinth seal 82 is provided to prevent the leakage of liquid between the first outlet chamber 61 and the rotating pipe 4. A second outlet chamber 62 is provided for receiving the liquid which leaks through the second labyrinth seal 82 from the first outlet chamber 61. In the second outlet chamber 62, unlike the first outlet chamber 61, the cooling liquid is not fully filled therein and therefore the cooling liquid may be contaminated by contacting the air. In order to prevent this, a gas supplying pipe 9 is provided. Shielding gas such as nitrogen or hydrogen is supplied into the second outlet chamber 62 through the gas supplying pipe 9 at all times so that the pressure in the second outlet chamber 62 is maintained slightly higher than the ambient atmospheric pressure thereby preventing the entry of air into the second outlet chamber 62. Thus, the liquid leaked into the second outlet chamber 62 is not brought into contact with atmospheric air and accordingly not contaminated. Therefore, the cooling liquid discharged from the second outlet pipe 72 of the chamber 62 can be recirculated through a heat exchanger and a supply pump (none of which are shown) as in the case of the cooling liquid discharged from the first outlet chamber 61.

In order to seal the shielding gas in the second outlet chamber 62, a sealing liquid supplying pipe 84 supplies a sealing liquid whose pressure is slightly higher than that of the shielding gas in the outlet chamber 62. The sealing liquid leaks into the second outlet chamber 62 through another labyrinth seal 83. The sealing liquid must be pure water, the same as the cooling liquid, because the cooling liquid discharged from the second outlet chamber 62 is recirculated without any water-purifying treatment as described above. On the other hand, atmospheric air is present in a third outlet chamber 63. Therefore, the sealing liquid leaked into the chamber 63 must be disposed of because it is contaminated. Of course, it can be used again by subjecting it to water-purifying treatment. However, whether or not the sealing liquid leaked into the chamber 63 is disposed of or used again, it is necessary to minimize the amount of sealing liquid leaked into the third outlet chamber 63 in order to eliminate the necessity of using a large amount of pure water or a large water purifying apparatus.

A thread 4b is cut in the outer wall of the cooling liquid supplying and draining pipe 4 in such a manner that its direction is opposed to the direction of rotation of the pipe 4 and it confronts a stationary surface 85. During high speed rotation, the thread 4b in combination with the stationary surface 85 provides a pumping effect to minimize the amount of sealing liquid leaking into the third outlet chamber 63. (Hereinafter, the thread 4b and the stationary surface 85 in combination will be referred to as "a thread seal" when applicable).

A pulsive, unstable phenomenon called "seal breakdown" may sometimes occur in the thread seal for high speeds of rotation. Especially, at a high speed of rotation of 3600 rpm. for instance, the probability of seal breakdown is high. This must be eliminated.

One of the factors causing the seal breakdown in a conventional thread seal will be described briefly. FIG. 3 shows the axial distribution of water pressure Ps on the stationary wall surface of the thread seal during low speed rotation. In FIG. 3, a seal length l is defined by the configuration of the thread seal, the speed of rotation and the sealing liquid supplying pressure. In FIG. 3, the water pressure at the bottom of the thread groove is made lower by as much as $P_E$ than the water pressure on the stationary wall surface by a centrifugal force. The differential pressure $P_E$ can be represented by the following equation (1):

$$P_E = \frac{\gamma \omega^2}{g} \int_{r1}^{r2} r\,dr \quad (1)$$

where r, r1 and r2 are as indicated in FIG. 3, $\gamma$ is the specific gravity of the liquid, $\omega$ is the angular rotation velocity, and g is the acceleration of gravity.

FIG. 4 shows the distribution of Ps for a medium speed of rotation. As the rotational speed for the case illustrated in FIG. 4 is higher than that of FIG. 3, the state in FIG. 4 is different from that of FIG. 3 in two points. First, as the pumping effect increases, the seal length l is reduced. Secondly, an interface is formed between the gas and the liquid in the thread groove on the low pressure side of the thread seal. The formation of the interface between the gas and the liquid can be explained as follows. As the value $P_E$ of the equation (1) increases, a region with $P < P_E$ is formed on the low pressure side of the thread seal where the water pressure Ps is small. In this region, the air enters the thread groove bottom. The radius rx of the interface between the gas and the liquid can be obtained from solving the following equation (2):

$$Ps = \frac{\gamma \omega^2}{g} \int_{rx}^{r2} r\,dr \quad (2)$$

As the rotational speed is further increased, the region where the interface is formed is spread towards the high pressure side finally covering the whole thread seal to cause the aforementioned phenomenon of seal breakdown.

Heretofore, the following techniques have been extensively employed to prevent the occurrence of seal breakdown.

(i) The thread is formed on the side of the stationary wall.

(ii) The length of the thread seal is increased.

According to the technique (i), as the effect of the centrifugal force is decreased, the probability of occurrence of seal breakdown decreases. However, as the pumping effect is also simultaneously decreased, it is necessary to increase the length of the thread seal.

With the technique (ii), the length of the thread seal is made longer than the predetermined value l so that, with the aid of the frictional loss of the increased length, the water pressure Ps is increased thereby preventing the occurrence of seal breakdown.

By employing the above-described techniques, seal breakdown can be presented. However, these techniques still leave problems unsolved. These problems will be described. As is clear from FIG. 1, the rotor shaft 5 is supported on bearings (not shown). However, it is impossible to provide bearings for the cooling liquid supplying and draining pipe 4 because of the presence of the outlet chambers, and accordingly the pipe 4 must be supported in the form of an overhang. Therefore, the pipe 4 will vibrate laterally continuously. This lateral vibration is undesirable because it disturbs the sealing effect. The longer the pipe 4, the greater will be the lateral vibration. The employment of either of the above-described techniques unavoidably increases the length of the supplying and draining pipe 4 and thus increases the probability of occurrence of dangerous lateral vibration.

SUMMARY OF THE INVENTION

An object of this invention is to provide a shaft sealing device which is stable in its sealing effect and cause no seal breakdown without increasing the length of the aforementioned thread seal.

In the shaft sealing device of the invention, the groove depth of the thread on the high liquid pressure side is made larger than that on the low liquid pressure side. In one embodiment of the structure of the thread, the difference in depth between adjacent threads is made larger on the high pressure side than on the low pressure side. In another embodiment, a plurality of thread grooves of equal depth are formed in the part where the fluid pressure is lowest.

The nature, principle and utility of the invention will become more apparent from the following detailed description when read in conjunction with the accompanying drawings.

BRIEF DESCRIPTION OF THE DRAWINGS

In the accompanying drawings

FIG. 1 is a sectional view showing a device for conducting a cooling liquid in an out of a rotary electric machine;

FIG. 2 is a sectional view taken along line II—II in FIG. 1;

DESCRIPTION OF THE PREFERRED EMBODIMENTS

Figure 3:
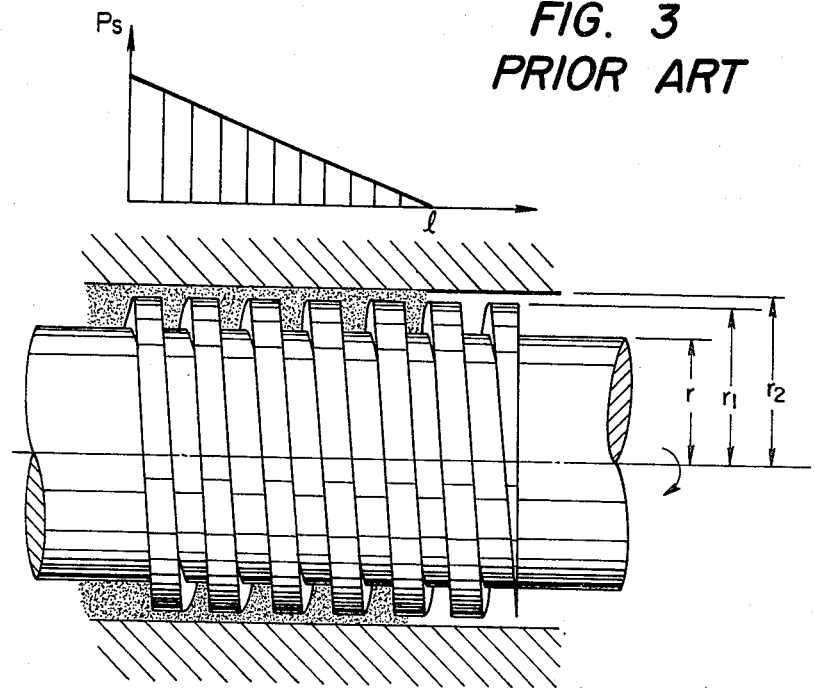
FIG. 3 is an explanatory diagram showing the distribution of pressure in a conventional thread seal during low speed rotation.
Figure 4:
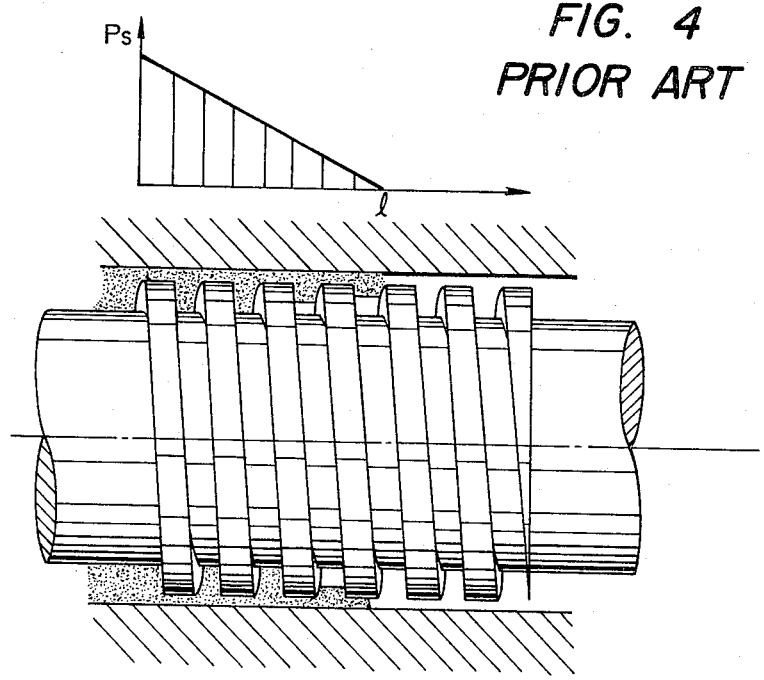
FIG. 4 is an explanatory diagram showing the distribution of pressure in the conventional thread seal during medium speed rotation.
Figure 5:
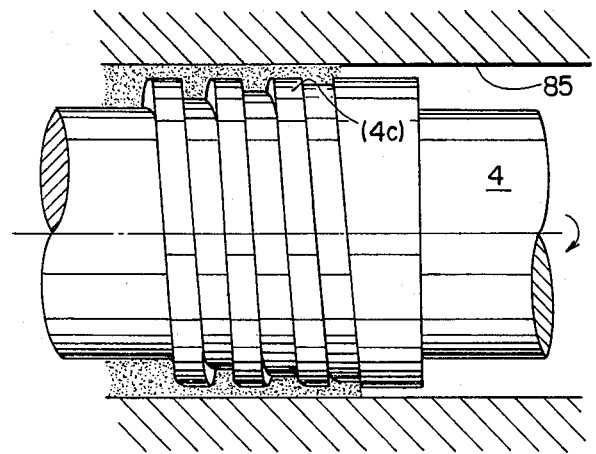
FIG. 5 is an explanatory diagram showing first preferred embodiment of a shaft sealing device constructed according to the invention.

Referring to FIG. 5, reference numeral 4c designates a thread which is cut in the outer wall of the above-described supplying and draining pipe 4 in such a manner that its direction is opposite to the direction of rotation of the pipe 4 and its thread groove is smaller in depth towards the lower pressure side (the atmospheric pressure side). Reference numeral 85 designates a stationary surface which the thread confronts. The sealing is achieved by the utilization of the pumping effect which is provided by the thread 4c and the stationary surface 85 in combination.

In FIG. 5, the groove depth is equal to or slightly larger than the value rx which is obtained by substituting the value Ps at the rated rpm into the equation (2). The thread groove is deeper on the high pressure side than on the low pressure side. Therefore, no interface separating the gas from the liquid is formed in the thread groove. This means that the effective length of the thread seal is made longer than the predetermined length l which prevents the occurrence of the aforementioned phenomenon of seal breakdown. No interface separating the gas from the liquid is formed in the threaded groove. Therefore, the liquid is maintained in contact with the bottom of the thread above thereby improving the pumping effect and decreasing the physical length l required for the thread seal.

In the above-described embodiment of the invention, the groove depth is determined by substituting the data Ps at the rated speed into the equation (2). The provision of the thread is allowed in the range of the predetermined length l at the rated speed as a result of which the sealing function is considerably lowered when the speed is lower than at the rated speed.

Figure 6:
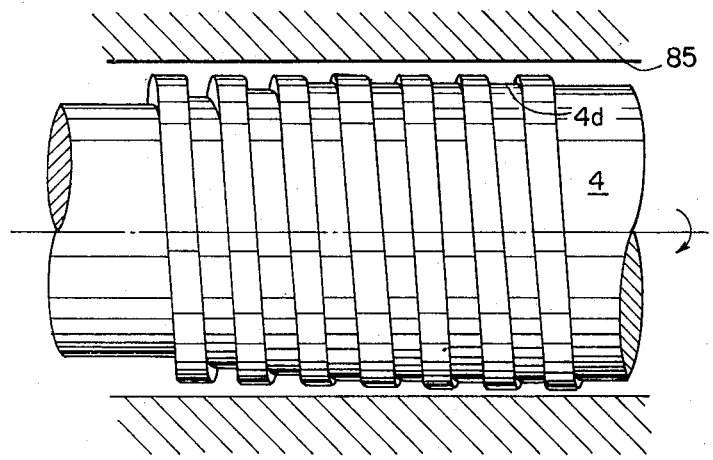
FIG. 6 is also an explanatory diagram showing a second preferred embodiment of a shaft sealing device constructed according to the invention.

When it is required to prevent the occurrence of breakdown at the rated speed and also to strongly effect the sealing function even when the speed is lower than the rated speed, a second embodiment of the invention as shown in FIG. 6 is preferred. In this embodiment the groove depth changes as in the case of FIG. 5 for about a half of the predetermined length l provided for the rated speed on the high pressure side of the thread seal and it is made constant for the remaining length with the length of the thread seal being increased. More specifically, in FIG. 6, reference numeral 4d designates a thread which is cut in the outer wall of the supplying and draining pipe 4 in such a manner that its direction is opposite to the direction of rotation of the pipe 4. Sealing is achieved by the thread 4d in association with the stationary surface 85.

In the embodiment of FIG. 6, the groove depth is made constant on the low pressure side of the thread seal. However, if the groove depth on the lower pressure side decreases at a lesser inclination than the inclination of the groove depth on the high pressure side, the sealing property for lower speed operation than the rated speed is made quite good.

In the above-described embodiments, the technical concept of the invention is applied to a device for conducting the cooling liquid in and out of the liquid cooled rotary electric machine. However, the invention can be applied to all types of rotary shaft sealing devices.

As is apparent from the above description, according to the invention, the groove depth of the thread seal is changed in the axial direction whereby a shaft sealing device which has a stable sealing effect and which causes no seal breakdown is provided without increasing the physical length of the thread seal.

What is claimed is:

1. A shaft sealing device comprising:
   a rotary shaft in an outer wall of which a thread is formed in such a manner that a groove depth thereof changes in an axial direction, said groove depth on the high pressure side of said thread being larger than that on the low pressure side of said thread;
   a stationary wall which confronts said thread;
   a radius of each of said grooves being such that a differential pressure $P_E$ existing between a bottom of each of said grooves and a surface of said stationary wall adjacent each of said grooves is less than a fluid pressure at said surface of said stationary wall adjacent each of said grooves so that seal breakdown is prevented, said differential pressure being created by rotation of said shaft.

2. The device as claimed in claim 1 in which said groove depth changes continuously from said high pressure side to said low pressure side.

3. A shaft sealing device comprising:
   a rotary shaft in an outer wall of which a thread is formed in such a manner that a groove depth thereof changes in an axial direction;
   said groove depth being constant in a first portion of said shaft on a low pressure side of said thread and said groove depth in a second portion of said shaft on a high pressure side of said thread decreasing towards the low pressure side, and a stationary wall which confronts said thread.

4. The device as claimed in claim 1 wherein said radius of each of said grooves is at least as large as a value rx obtained from the equation $$Ps = \frac{\gamma \omega^2}{g} \int_{rx}^{r2} r \cdot dr$$

where Ps is a pressure of a fluid on a surface of said stationary wall adjacent said groove, $\gamma$ is the specific gravity of said fluid, $\omega$ is the angular rotation velocity of said shaft, g is the acceleration of gravity, and r2 is the outer radius of said stationary wall.

5. The device as claimed in any one of claims 1, 2, 3 or 4 in which said rotary shaft is adapted for supplying cooling liquid to the rotor of a rotary electric machine.

6. A shaft sealing device comprising:
a rotary shaft in an outer wall of which a thread is formed in such a manner that a groove depth thereof changes in an axial direction;
a stationary wall which confronts said thread;
means for forming first, second and third outlet chambers;
first through fourth labyrinth seals, one of said labyrinth seals being provided at each intersection of a wall of each of said outlet chambers and said shaft, said first outlet chamber being filled with a cooling liquid of the same type as supplied through said rotary shaft, said second outlet chamber being partially filled with said cooling liquid and an upper portion of said second outlet chamber being coupled to a source of shielding gas, and said stationary wall being disposed between said second and said third outlet chambers; and means for supplying shielding liquid on said high pressure side of said thread.

7. The device as claimed in claim 1, wherein said groove depth is constant in a first portion of said shaft on the low pressure side of said thread and said groove depth in a second portion of said shaft on the high pressure side of said thread decreases towards the low pressure side.

8. The shaft sealing device of any one of claims 1, 2, 3, 4 or 7 further comprising means for forming first, second and third outlet chambers; first through fourth labyrinth seals, one of said labyrinth seals being provided at each intersection of a wall of each of said outlet chambers and said shaft, said first outlet chamber being filled with a cooling liquid of the same type as supplied through said rotary shaft, said second outlet chamber being partially filled with said cooling liquid in an upper portion of said second outlet chamber being coupled to a source of shielding gas, and said stationary wall being disposed between said second and said third outlet chambers; and means for supplying shielding liquid on said high pressure side of said thread.

* * * * *